United States Patent [19]

Toepke

[11] 4,383,175

[45] May 10, 1983

[54] ENCAPSULATED SCINTILLATION DETECTOR

[75] Inventor: Ival L. Toepke, Newbury, Ohio

[73] Assignee: Bicron Corporation, Newbury, Ohio

[21] Appl. No.: 192,540

[22] Filed: Sep. 30, 1980

[51] Int. Cl.³ ............................................. G01T 1/202
[52] U.S. Cl. ................................ 250/368; 250/361 R; 250/483.1
[58] Field of Search ................... 250/483, 361 R, 521, 250/485, 261, 368; 228/903, 46, 174

[56] References Cited

U.S. PATENT DOCUMENTS

| | | | |
|---|---|---|---|
| 584,750 | 6/1897 | Scribner | 238/903 |
| 2,759,252 | 8/1956 | Van Embden | 228/903 |
| 2,767,466 | 10/1956 | Faulkner | 228/903 |
| 2,853,621 | 9/1958 | Ruderman | 250/483 |
| 3,005,101 | 10/1961 | Bradford et al. | 250/71.5 |
| 3,538,298 | 11/1970 | Duston et al. | 219/121 |
| 3,552,630 | 1/1971 | Dean | 228/46 |
| 4,004,151 | 1/1977 | Novak | 250/483 |
| 4,063,062 | 12/1977 | Kuhnen | 219/121 |
| 4,117,300 | 9/1978 | Ricards | 219/121 |
| 4,128,766 | 12/1978 | Stevens | 250/483 |
| 4,158,773 | 6/1979 | Novak | 250/361 R |

Primary Examiner—Alfred E. Smith
Assistant Examiner—Carolyn E. Fields

Attorney, Agent, or Firm—Pearne, Gordon, Sessions, McCoy, Granger & Tilberry

[57] ABSTRACT

An encapsulated scintillation detector is disclosed in which a detector crystal or the like is encapsulated in a hermetically sealed housing having a light-transmitting window at one end. In some instances, the window is mounted in a window assembly by a compression seal established by the differential coefficient of expansion and contraction during the cooling of the assembly. In other instances, the window is chemically bonded to the ring with or without a compression seal. The window is mounted within a ring, which is in turn welded to the end of a tubular body portion of the housing along thin weld flanges to reduce the amount of weld heat which must be applied. A thermal barrier is provided to resist the flow of welding heat from the weld to the seal between the ring and the window. Such thermal barrier includes a zone of relatively thin section located between the weld zone and the seal through which weld heat must flow. The zone of relatively thin cross section is, in some embodiments, provided by a groove cut partially through the wall of the ring. A layer of low friction material such as Teflon is positioned between the tubular body and the crystal to minimize friction resisting relative axial movement created by differential coefficients of thermal expansion.

11 Claims, 4 Drawing Figures

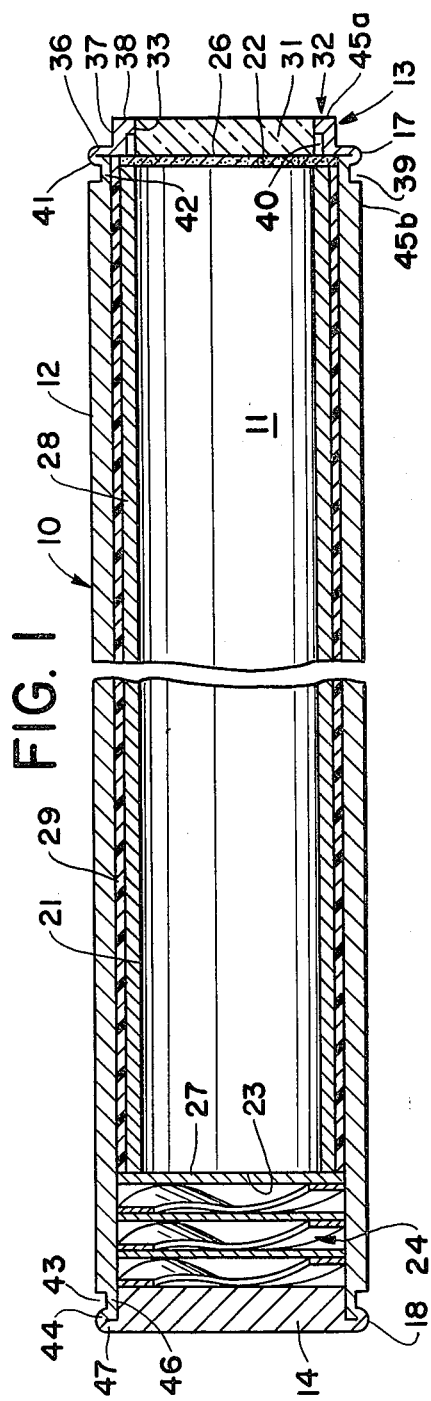
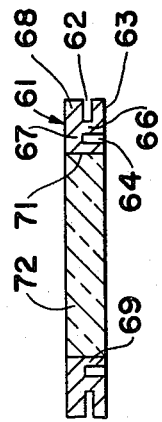
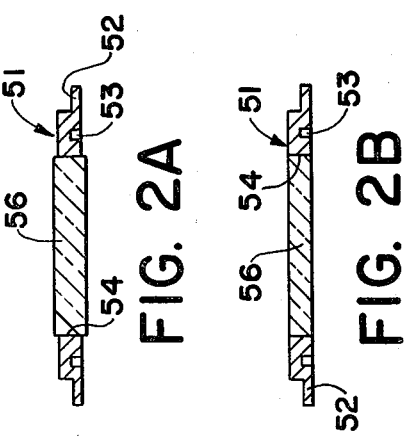

ENCAPSULATED SCINTILLATION DETECTOR

BACKGROUND OF THE INVENTION

This invention relates generally to scintillation detectors which are used, for example, to measure radiation at successive depths of bore holes in the earth and, more particularly, to a scintillation detector having a novel and improved hermetically sealed housing and which includes a novel and improved window assembly.

U.S. Pat. No. 4,004,151, assigned to the assignee of the present invention, discloses a scintillation detector of the type to which this invention relates. This patent describes in considerable detail the types of scintillation crystals employed in such devices, their operation, and requirements. Such patent is incorporated by reference for such disclosure.

In U.S. Pat. No. 4,004,151, a detector is disclosed in which a tubular case for encapsulating a crystal is closed by a plug or cap at one end and by a window mounted with epoxy at the other end. In addition, such patent discloses a structure in which the crystal is spring-loaded toward an optical coupling with the window. A purpose of such spring-loading structure is to allow thermal expansion of the crystal relative to the case resulting from the fact that the crystal has a much higher coefficient of thermal expansion than the case material.

The principal purpose of such encapsulation structure is to provide a hermetically sealed enclosure for the scintillation crystal to prevent the crystal and other internal parts of the assembly from being damaged by exposure to the detector's environment. For example, such crystals are usually highly hygroscopic and are damaged if exposed to moisture.

In a related copending application Ser. No. 185,292, filed Sept. 8, 1980, now U.S. Pat. No. 4,360,733, an improved window mounting structure is disclosed in which an adhesive such as epoxy is used to secure the window in a retaining ring adapted to be welded to the window end of a scintillation detector case.

SUMMARY OF THE INVENTION

The present invention is directed to a novel and improved encapsulation structure for scintillation detectors or the like. There are a number of aspects to this invention.

In accordance with one aspect of the invention, a detector case is provided with a novel and improved weld structure at both ends to provide a permanent seal which does not deteriorate with time, pressure, or temperature.

In accordance with another aspect of this invention, a novel and improved window structure is provided which is capable of operating at elevated temperatures without damage or leakage.

In accordance with still another aspect of this invention, lubrication means are provided along the length of the detector between the housing and the crystal to reduce any tendency for a locking friction to prevent relatively free axial movement between the crystal and the tubular housing resulting from differential thermal expansion therebetween. If such relative axial movement cannot occur, excessive pressure can develop between the window and crystal.

In the illustrated embodiment, a crystal such as an alkali metal halide or BGO (bismuth germanate) scintillation crystal is encapsulated in a stainless steel tube having a window assembly welded to one end. Such window assembly includes a window mounted and retained within a metal ring with a hermetic seal. In some instances, for example, when the ring is formed of stainless steel, the hermetic seal is provided by a chemical bond and when a proper selection of coefficients of thermal expansion is used, the chemical bond is supplemented by a compression seal. In other instances, a chemical bond is not produced and the hermetic seal is provided by a compression seal. For example, when the ring is formed of nickel-plated, cold-rolled steel, there is no significant chemical bond formed and the seal is produced by compression which is established by differential contraction as the glass and ring are cooled.

Both the main tube and the window ring are provided with weld portions partially isolated from the remaining structure by a thermal barrier which resists welding heat flow to the crystal and to the window to prevent damage to either of them during welding operations. In the illustrated embodiments, the thermal barriers are provided by a relatively thin section which does not transmit weld heat at sufficiently high rates to cause heat damage to the window seal and to the enclosed crystal. These thermal barriers also permit welding temperatures to be reached with the addition of lower amounts of heat. Such thin section is provided, in the illustrated embodiment, by a thin flange, and thin sections are provided in the illustrated embodiments by grooves cut part-way through the wall structure.

The window assembly consists, in the illustrated embodiment, of a window or lens formed, for example, of a soda-lime glass and a window retaining ring of high chromium-low nickel stainless steel (e.g., type 430) or nickel-plated, cold-rolled steel. When a compression seal is to be provided, the coefficient of thermal expansion of the glass is selected to be less than the coefficient of thermal expansion of the stainless steel ring. The compression seal is preferably established by heating both the ring and the glass until the glass softens and reaches a working state. Prior to softening, the ring, because of its higher thermal coefficient of expansion, expands a greater amount than the glass. However, once the glass softens and flows out into intimate engagement with the ring and the two are carefully cooled, the glass solidifies while both the ring and the glass are at an elevated temperature and as the two continue to cool, the ring attempts to shrink more than the glass, placing the ring in tension and the glass in compression. This produces a permanent hermetic compression seal.

In some instances in which the ring is formed of high chromium-low nickel stainless steel, a chemical bond is also established between the glass and the tenacious chromium oxide layer formed on the surface of the ring. This chemical bond is produced during the heating and cooling cycle and provides a good hermetic seal even when a compression seal is not produced.

Normally, a layer of aluminum oxide powder is positioned within the housing between the inner surface thereof and the outer surface of the crystal. When such powder is compressed by the differential thermal expansion in a radial direction, there is a tendency for friction to be developed which resists axial differential expansion between the crystal and the housing. To overcome or minimize such friction, a lubricant layer is provided between the oxide powder and the housing. Preferably, such layer is in the form of a Teflon sheath extending lengthwise of the detector adjacent the inner wall of the tubular housing. With such lubricating layer, the buildup of friction is substantially reduced so that differential axial expansion between the housing and crystal can be accommodated by an end-loading spring without placing excessive forces on the window and/or its seal.

These and other aspects of this invention are more fully described in the following description and drawings.

BRIEF DESCRIPTION OF THE DRAWINGS

FIG. 1 is a side elevation in longitudinal section of an assembled scintillation detector in accordance with the present invention, illustrating a first embodiment of a window assembly welded to the end of the housing;

FIG. 2a is a longitudinal section of another embodiment illustrating the window and the ring prior to the heating operation used to establish a seal at the interface therebetween;

FIG. 2b is a view of the embodiment of FIG. 2a after establishing the seal between the window and the ring and after the window is polished; and FIG. 3 is a cross section of a third embodiment of a window assembly in accordance with the present invention.

DETAILED DESCRIPTION OF THE DRAWINGS

FIG. 1 illustrates a typical scintillation detector incorporating the present invention. Such detector includes a tubular housing 10 which encapsulates a cylindrical crystal 11, which may be, for example, an alkali metal halide crystal or other crystal materials such as, for example, a bismuth germanate crystal. The housing 10 consists of a tubular metal body 12 closed at one end by a window assembly 13 and at the other end by a metal plug or cap 14. Both the window assembly 13 and the plug 14 are joined to the associated ends of the body 12 by peripheral welds at 17 and 18, respectively.

The crystal 11 is often a high purity thallium-activated sodium iodide, and is cut or machined to provide a smooth, cylindrical external surface 21 and flat and parallel end faces 22 and 23. The end face 22 is positioned adjacent to the window assembly 13 and a spring system 24 is positioned between the end cap or plug 14 and the other end face 23 to resiliently urge the crystal 11 toward the window assembly 13 to maintain an optical coupling via a layer of suitable optical coupling material 26 between the crystal 11 and the window assembly 13. Positioned between the spring system 24 and the end face 23 of the crystal 16 is a backplate 27 formed of a scintillating light-reflecting material. In the illustrated embodiment, the spring system includes several wave springs and spacer plates. However, other types of spring systems may be utilized, if desired.

Positioned around the external surface 21 of the crystal 11 is a layer 28 of a shock-absorbing, light-reflecting packing, for example, powdered aluminum oxide. Between the layer 28 and the tubular body 12 is a lubricating layer, preferably formed of a skived sheet 29 of Teflon. The Teflon sleeve 29 and the spring system 24 cooperate to allow differential expansion between the crystal 11 and the housing 10 without resulting in excessive forces on either the crystal or the elements of the housing assembly. Typically, the crystal has a coefficient of thermal expansion which is substantially greater than the coefficient of thermal expansion of the material forming the housing. Therefore, as the temperature of the crystal increases, it tends to expand in axial and radial directions at a greater rate than the housing.

The axial differential expansion causes a reduction in the size of the end clearance and compression of the spring system 24. Radial differential expansion tends to compress the layer 28 and would tend to establish a friction resisting the relative axial movement if it were not for the low friction property of the Teflon layer 29. It should be noted that even though the layer 28 is a loose powder initially, it tends to pack at high temperatures and it can, in some instances, function essentially as a solid layer. Therefore, the presence of the Teflon layer 29 is important in maintaining the freedom for relative axial movement during differential thermal expansion to prevent excessive loads from being applied either to the crystal or to the window assembly. In effect, the window assembly is subjected to an axial load which is determined primarily by the spring system 24 and the cushioning effect of such spring system eliminates the existence of excessive thermally-induced loads on the window assembly.

In a preferred form of this invention, the window assembly is formed of a cylindrical piece of glass 31 hermetically sealed within a window-retaining ring 32. The glass material is transparent to the type of light generated by the associated scintillation crystal 11 when such crystal is bombarded by ionizing radiation.

An example of a type of glass which may be used in the window assembly 13 is a soda-lime glass having a coefficient of thermal expansion at room temperature of approximately $8 \times 10^{-6}$ to $10 \times 10^{-6}$ inches per inch per degree centigrade. The ring 32 may, for example, be a stainless steel ring with a coefficient of thermal expansion of about $9 \times 10^{-6}$ to $12 \times 10^{-6}$ inches per inch per degree centigrade. For a particular assembly, when a compression seal is desired, the ring 32 is selected to have a slightly greater coefficient of thermal expansion than the glass 31, and it is this differential thermal expansion which is utilized to establish a compression seal at the interface 33 between the glass 31 and the ring. As discussed below, high chromium-low nickel stainless steel also produces a chemical bond or seal with the glass which can produce a good hermetic seal even when a compression seal does not exist.

The compression seal alone can be used to provide the hermetic seal when required. For example, when the ring is formed of a nickel-plated cold-rolled steel, the glass does not produce any significant chemical bond with the nickel plating material. However, when the coefficients of thermal expansion are related, for example, as set forth above, and the cooling is properly controlled, the ring is in tension and the glass is in compression to produce a compression seal therebetween.

The production of such compression seal is accomplished by assembling a piece of glass 31 within the ring 32, with a close or slip fit at ambient temperature. The fitted ring assembly is preferably placed in an appropriate graphite jig assembly in a reducing environment, such as an atmosphere of 95% nitrogen and 5% hydrogen, and is slowly heated to a temperature slightly above the temperature of the working point (for example $10^4$ poises) of the glass. For soda-lime glass, the assembly is heated to a temperature of about 1005° C.

During the heating process, the ring thermally expands radially and at a faster rate than the glass, causing the gap or clearance between the two to gradually increase. However, when the working temperature is reached, the glass 31 flows radially into intimate contact with the ring at the interface 33. If required, suitable graphite jig means can be applied to the glass to facilitate such radial flow in its softened state.

When the ring 32 is formed of a high chromium-low nickel stainless steel, a chemical reaction occurs at the interface 33 during the heating. Residual oxygen in the atmosphere combines with the chromium at the interface to form a tenacious layer of chromium oxide which fuses to the glass at the interface 33 to form a chemical bond.

After the glass has been softened and flows radially, producing the intimate contact between the glass and the ring at the interface, the combination is slowly cooled. During the cooling operation, the glass solidifies at a relatively high temperature and subsequent continued cooling establishes a compression seal along the interface 33 resulting from the differential coefficient of thermal expansion and contraction. During such cooling, the ring attempts to shrink more than the glass and the ring 32 is placed in tension while the glass 31 is placed in compression.

In some instances in which a chemical bond is established, it may be desirable to eliminate any strain in the glass, and in turn any compression seal, even when the coefficients of thermal expansion of the glass and ring differ. In such instance, the cooling is controlled to stress-relieve or anneal the glass or the material of the ring and window are selected to have the same coefficient of thermal expansion.

After the cooling is completed, the glass 31 is ground and polished, as required, to produce the desired scintillation light transmission characteristics.

Although soda-lime glass and a stainless steel ring are given as an example of suitable materials for producing the window assembly, it should be understood that other glasses or transparent materials having suitable characteristics may in certain instances be used. Further, other materials may be used for the ring 32. It is important, however, when a compression seal is desired, to properly match the coefficients of thermal expansion of the two materials so that a compression seal is produced and preferably so that a chemical bond is also established at the interface between the window and the ring. Further, when a chemical bond is required, with or without a compression seal, the glass and ring material should be selected which produce such bond.

In order to permit the welding completely around the circumference of the ring 32 at weld 17, the rings are arranged so that the application of the welding heat does not result in damage to the seal provided at the interface 33 or to the window 31 itself. In addition, the structure is arranged so that the crystal 11 is not damaged by the application of the welding heat.

Further, when the crystals are highly hygroscopic, they must be handled and maintained in a low humidity dry box or the like. When the production of the welds 17 and 18 is performed in a dry box, TIG (tungsten inert gas) welding or the like is preferably used, in which there is no combustion to produce water vapor. It is also preferable to arrange the parts so that the weld is accomplished without the addition of any metal but, instead, involves only the fusing of existing metal of the tubular body 12, the ring 32, and the cap 14.

In order to minimize the flow of welding heat to the interface 33, the embodiment of FIG. 1 is provided with a ring having a radially extending, relatively thin flange 36 which joins at its inner end with an axial flange 37.

At the end of the flange 37 opposite the flange 36 an inwardly extending shoulder 38 is provided which extends inwardly of the ring to the interface 33. With this structure, in which the flanges 36 and 37 are relatively thin and are spaced from the window 31 at 40 by the shoulder 38, a thermal barrier is provided to resist or limit the flow of heat from the weld at 17 to the interface 33.

Adjacent to the flange 36, the tubular body 12 is provided with a radially extending groove 39 which extends a substantial distance through the wall of the tubular body 12 to again define a thermal barrier structure. Axially beyond the groove 39, the body provides a relatively thin-walled, radial flange 41 which abuts the radial flange 36 of the ring 32. Here again, the relatively thin section provided by the flange 41 resists the flow of substantial amounts of heat. Further, the heat exiting the flange 41 into the body 12 must pass through a relatively thin section 42 below the groove 39. With this structure, a thermal barrier is provided in both the tubular body 12 and the ring 32 to resist flow of heat into the main part of the body 12 and into the portion of the ring 32 at the interface 33.

In addition, it is customary to provide chill rings or heat sinks (not illustrated) which engage the parts at locations spaced from the weld to remove a substantial portion of the weld heat before it reaches the interface 33 between the ring and the glass or the crystal 11. The rings and body provide a substantial area at surfaces 45a and 45b, respectively, for contact with such chill rings or heat sinks to permit them to remove the heat through the areas of contact. Preferably, such heat removing means are structured to also engage both the ring 32 and the tubular body 12 adjacent to the weld to remove heat therefrom and to maintain the window assembly 13 and tubular body 12 in proper position for welding. The thin sections and heat removal means cooperate to prevent the presence of damaging temperatures at the interface where the seal exists between the window and the ring and also prevents damage to the adjacent portion of the crystal 11 and the optical coupling layer 26.

In addition, with the thermal barriers providing the thin sections at the weld, relatively small amounts of heat are required to raise the flanges to welding temperatures.

After the welding operation, the flanges 36 and 41 are fused to produce a permanent weld connection which is impervious to fluids and which structurally joins the window assembly to the tubular body.

The structure of the joint between the window assembly and the tubular body involving the two radial flanges 36 and 41 joined at the weld 17 has additional advantages. In some instances, the ring 32 is formed of a material having a slightly different coefficient of thermal expansion from the tubular body 12 and, in such instances, differential expansion and contraction can occur during the heating and cooling of the assembled detector. This differential expansion can be accommodated by the thin structure at 37 and 42 without excessive strain by causing a tipping of the two sections which is within the elastic limit of the materials thereof. Because of the relatively thin walls, this distortion created by differential thermal expansion does not cause a rupture of the weld and, therefore, does not impair the operation of the seal.

A similar structure is provided in the weld at 18 between the opposite end of the tubular body 12 and the cap member 14. Here again, a groove 43 is provided adjacent the end of the tubular body to produce a relatively thin flange 44 isolated from the remaining portions of the tubular body 12 by a relatively thin section 46 below the groove 43. The cap member 14 is also provided with a relatively thin radial flange 47 which abuts the flange 44 and provides a peripheral area of relatively thin section which is fused to produce the weld 18 and the permanent hermetically sealed connection between the body 12 and the cap 14.

In the illustrated embodiment, the cap 14 is provided with a cylindrical extension 48 which closely fits the inner surface of the tubular body 12 to radially locate the two elements, provide increased strength, and limit distortion resulting from weld heat. In the instance of the weld 18, the criticality of the thermal barrier is not as great as it is at the opposite end at the weld 17, since the end face 23 of the crystal 11 is spaced a substantial distance from the weld 18. However, it is desirable to provide a thermal barrier even at such end since it causes a concentration of heat along the periphery of the two flanges, which ensures good fusion of the materials at the weld 18.

FIGS. 2a and 2b illustrate a second embodiment of a window assembly in which a ring 51 is again provided with a relatively thin, radially extending flange 52. In this embodiment, however, an axial groove 53 is located between the flange 52 and the inner surface 54. The inner surface 54 constitutes part of the interface with the window element 56.

As best illustrated in FIG. 2a, the window element 56 is initially provided with a thickness greater than the thickness of the ring 51 and is proportioned to permit assembly within the inner cylindrical wall 54 with a close or slip fit prior to the heating operation. Here again, the window material may be soda-lime glass having a coefficient of thermal expansion slightly less than the coefficient of thermal expansion provided by a stainless steel ring 51.

The two elements are heated together until a working temperature is reached at which softening of the window element 56 occurs. While in such softened state, the window element 56 flows radially into intimate engagement with the inner wall 54. Preferably, a chemical bond is also produced as described above. The bonded and intimately engaged assembly is then allowed to cool to establish, through the differential contraction, a compression seal in the same general manner as described above.

After cooling, the window element 56 is polished, reducing the window thickness of the final assembly to a thickness approximately equal to the thickness of the ring 51, as illustrated in FIG. 2b. Such assembly, consisting of the ring 51 and window 56, is then welded to the end of a tubular body 12 in the same manner as described above to provide a hermetically sealed closure of one end of the detector. The opposite end is closed in the same manner as illustrated in FIG. 1.

FIG. 3 illustrates still another embodiment which is structurally similar in many respects to the embodiment of FIG. 1 but provides two series-connected thin sections to resist flow of welding heat to the interface between the ring and the glass. In this embodiment, a ring 61, formed for example of cold-rolled steel, is provided with a radial groove 62 to form a thin, radially extending weld flange 63. A second axially extending groove 64 is located inwardly of the groove 62 and in cooperation therewith forms a thin section 66. Beyond the end of the groove 64 is a radially extending, section 67. Adjacent to the thin section 66 and section 67 is a portion 68 of increased cross section which provides substantial surface area for engagement by heat removal means. Radially inward of the groove 64 is a thin, tubular section 69 which provides an interface 71 with a window 72 of the same general structure as the window 56 of the second embodiment. Here again, the hermetic seal between the window 72 and the ring 61 is established by heating the two elements to a temperature at which the window material flows to establish the compression seal during the subsequent cooling.

In this embodiment, like the first embodiment, the flange 63 is positioned adjacent to a flange 41 and a weld is made along the periphery of the two flanges by fusing the materials thereof into a single homogeneous mass while a chill ring or heat sink heat removing means engages the ring and body 12. Because of the relatively thin section of the flange 63, it is possible to produce a good weld without adding excessive heat. Some heat, of course, does pass along the thin section 66 and causes heating of the mass of material at 68. Most of the heat, however, is removed at this location by the chill ring or the like, so very little heat passes through the section 67 to the interface 71. Here again there is cooperation of a thermal barrier plus a heat sink to prevent damaging temperatures from existing along the interface 71.

With the present invention, a superior seal is provided along the interface between the window and the ring which is able to withstand relatively high pressures and temperatures. For example, the seals provided by the chemical bond and/or compression seals provided at such interface have functioned in an environment in which the detector is exposed to temperatures of at least 200° C. Further, since the remaining joints are closed by welds, there is substantially no likelihood of leakage or seal deterioration during the use of the detector.

In each of the embodiments, a thermal barrier is provided by thin sections to prevent damaging temperatures from reaching the interface between the window and associated ring and from reaching the crystal 11. Further, a thin weld flange structure has been provided in each embodiment in which weld temperatures can be achieved at the periphery of the flanges without requiring large amounts of heat to be applied for the welding operation. Additionally, the structure provides flexibility to allow limited differential expansion between the ring and the body member. The avoidance of excessive forces also results from the presence of a lubrication liner, which in the illustrated embodiment is a sleeve of Teflon positioned adjacent to the inner wall of the tubular body.

Although the preferred embodiments of this invention have been shown and described, it should be understood that various modifications and rearrangements of the parts may be resorted to without departing from the scope of the invention as disclosed and claimed herein.

What is claimed is:

1. A scintillation detector comprising a detector element and a hermetically sealed housing encapsulating said detector element, said housing including a window assembly providing a light-transmitting glass window and a metal mounting ring, a hermetic glass-to-metal seal being established between said ring and window, said window being optically coupled to the detector element by a layer of optical couplant material, said ring being welded to the remainder of said housing after it is assembled with said window, said detector including thermal barrier means incorporated into said housing at a position between the weld site and said hermetic seal and couplant material to prevent welding heat from damaging the hermetic seal and the couplant material.

2. A detector as set forth in claim 1, wherein said thermal barrier means is in said ring.

3. A detector as set forth in claim 2, wherein said thermal barrier includes a thin portion joining said weld and the seal with said window.

4. A detector as set forth in claim 3, wherein said thin portion includes a radial flange and said weld extends along the periphery of said flange.

5. A detector as set forth in claim 4, wherein said thermal barrier includes a groove extending a substantial distance through said ring to produce a thin section between said weld and said seal.

6. A detector as set forth in claim 2, wherein said housing is provided with a second thermal barrier on the side of said weld remote from said ring.

7. A detector as set forth in claim 6, wherein said housing provides a pair of relatively thin, radially extending flanges joined at their periphery by said weld.

8. A detector as set forth in claim 7, wherein a sheath of material having a low coefficient of friction is provided between said detector element and said housing to reduce friction resisting relative movement therebetween.

9. A detector as set forth in claim 8, wherein said sheath is polytetrafluoroethylene.

10. A scintillation detector comprising a crystal of cylindrical section and a metal housing encapsulating said crystal, said housing providing a window formed of a material capable of transmitting light produced by said crystal, said window being located adjacent to one end of said crystal, spring means located adjacent to the opposite end of said crystal operable to resiliently urge said crystal toward said window, and a sheath of low-friction material positioned between said crystal and housing along the length of said crystal to reduce friction tending to resist relative axial movement therebetween.

11. A detector as set forth in claim 10, wherein said sheath is formed of polytetrafluoroethylene.

* * * * *